United States Patent [19]

Parker et al.

[11] Patent Number: 4,646,964
[45] Date of Patent: Mar. 3, 1987

[54] TEMPERATURE CONTROL SYSTEM

[75] Inventors: Jeffrey L. Parker; Edward Parker, both of Jacksonville, Fla.

[73] Assignee: Parker Electronics, Inc., Jacksonville, Fla.

[21] Appl. No.: 434,259

[22] Filed: Oct. 14, 1982

Related U.S. Application Data

[63] Continuation-in-part of Ser. No. 362,142, Mar. 26, 1982, abandoned.

[51] Int. Cl.[4] .............................................. F24F 7/00
[52] U.S. Cl. ...................................... 236/49; 236/1 B; 236/94; 165/11.1
[58] Field of Search .............. 236/49, 1 B, 1 C, 91 D, 236/91 F; 165/27, 11 R

[56] References Cited

U.S. PATENT DOCUMENTS

| | | | |
|---|---|---|---|
| 2,570,781 | 10/1951 | Duerr, Jr. | 374/1 |
| 3,841,394 | 10/1974 | Van Becelaere | 165/30 |
| 4,068,799 | 1/1978 | Brodin | 236/49 |
| 4,182,484 | 1/1980 | Stanke et al. | 236/1 C |
| 4,263,931 | 4/1981 | Bramow | 137/84 |
| 4,265,395 | 5/1981 | Sumikawa et al. | 236/13 |
| 4,294,404 | 10/1981 | Gajjar | 236/49 |
| 4,319,711 | 3/1982 | Barker et al. | 236/46 R |
| 4,438,380 | 3/1984 | Kaseta | 318/696 |
| 4,445,455 | 5/1984 | Cannon | 374/1 |

OTHER PUBLICATIONS

Krueger Form #5200, 5/81.
Trane Electric Air Valve.
I. Koppers, Environmental Elements; Titus Enviro-Master.

Primary Examiner—William E. Wayner
Attorney, Agent, or Firm—Arthur G. Yeager

[57] ABSTRACT

A temperature control system used in association with a heating and cooling system supplying warm or cool air to a duct system for maintaining accurate temperature in a zone of multiple zones utilizing a microcomputer based thermostat for modulating a damper assembly in the duct system feeding the zone, thereby controlling the volume of air flow in the duct system to the zone to match the load in each zone. The thermostat has a digital readout display thereon indicating the temperature to be maintained in the zone and which can selectively display the duct temperature of air and/or the zone temperature of the air. The thermostat controls a damper assembly which includes a stepper motor for pivoting the damper blade between open and closed positions with the duct temperature sensor located before the damper blade in the duct. Calibration to provide setting of the zone temperature to conform with an accurate thermometer is provided in the thermostat, as well as selectable stop positions for the damper blade.

33 Claims, 8 Drawing Figures

TEMPERATURE CONTROL SYSTEM

This application is a continuation-in-part of Ser. No. 362,142, filed Mar. 26, 1982 now abandoned.

BACKGROUND OF THE INVENTION

1. Field of the Invention

The present invention generally relates to a system for accurately controlling the temperature of a zone of a plurality of zones or areas which are supplied with conditioned air by controlling the inflow of such conditioned air through a unique damper system and thermostat assembly.

2. Description of the Prior Art

Various systems and arrangements have been provided to maintain various areas and zones at predetermined temperature conditions or ranges, including arrangements to provide zonal controls so that different zones associated with a central heating or cooling system can be maintained at different temperatures with such devices including manual controls, automatic controls, and the like. The following U.S. patents are exemplary of the prior art. U.S. Pat. Nos.:

3,643,862—Feb. 22, 1972
3,690,548—Sep. 12, 1972
3,814,312—June 4, 1974
3,825,182—July 23, 1974
3,841,394—Oct. 15, 1974
4,072,268—Feb. 7, 1978
4,175,401—Nov. 27, 1979
4,182,484—Jan. 8, 1980
4,258,877—Mar. 31, 1981

The above patents disclose various arrangements for zonal temperature control including damper arrangements which are motor controlled in response to temperature conditions in a particular zone.

SUMMARY OF THE INVENTION

An object of the present invention is to provide a temperature control system used in heating, ventilating and air conditioning systems for controlling the air flow into a zone so that the air flow matches the existing load in the zone in order to accurately maintain a desired temperature in the zone.

Another object of the invention is to provide a temperature control system utilizing an air duct damper assembly in which the position of the damper is controlled by a stepper motor that is controlled by a computerized thermostat.

A further object of the invention is to provide a computerized thermostat, in accordance with the preceding objects, having a digital readout which indicates the temperature that the thermostat is set to maintain in the area which it controls, with the thermostat operating within certain ranges, and including push button means enabling the temperature to be raised or lowered, and capable of being manually or remotely altered, and indicating a full open and full closed position of the damper. The thermostat has a visual readout that depicts the duct temperature at the damper to be displayed at the thermostat with the thermostat controlling the damper in both the heating and cooling mode based on duct temperature with the thermostat also indicating the mode in which the damper is operating.

Yet another object of the invention is to provide a control system in accordance with the preceding objects in which the thermostat includes maximum and minimum damper position settings which can be adjusted.

Yet another object of the invention is to provide a control system enabling automatic changeover between heating and cooling modes with the changeover being accomplished by a sensor oriented in the duct, so that when the duct temperature exceeds room temperature, the thermostat will so indicate and the damper will modulate open on a call for heating and modulate closed on a call for cooling. When the duct temperature drops below room temperature, the thermostat will so indicate and the damper will then modulate open on a call for cooling and modulate closed on a call for heating, thereby providing automatic changeover from heating to cooling and automatic indication at the thermostat the operating mode of the system.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Referring now specifically to the drawings, an area or zone in which the temperature is to be controlled is schematically illustrated as a room or other enclosure, generally designated by numeral 10, and defined by walls, floor, ceiling, and the like, with an air register 12, or other device, provided for supplying conditioned air to the zone 10 in which a duct system 11 is connected to the register 12 and includes a segment of duct 14 incorporated into the duct system 11 to control the flow of conditioned air into the zone 10. A thermostat, generally designated by numeral 16, is mounted on a suitable surface, such as a wall surface, or the like, in the zone 10 to be controlled for modulating a damper 18 in the duct 14 thereby controlling the inflow of conditioned air into the zone 10. It is to be noted that the illustration in FIG. 1 of the drawings is merely representative and the system in accord with the invention can be used for controlling conditioned air into multiple zones and also utilized in various installations in which it is desired to accurately maintain a set temperature in the zone 10.

Figure 2:
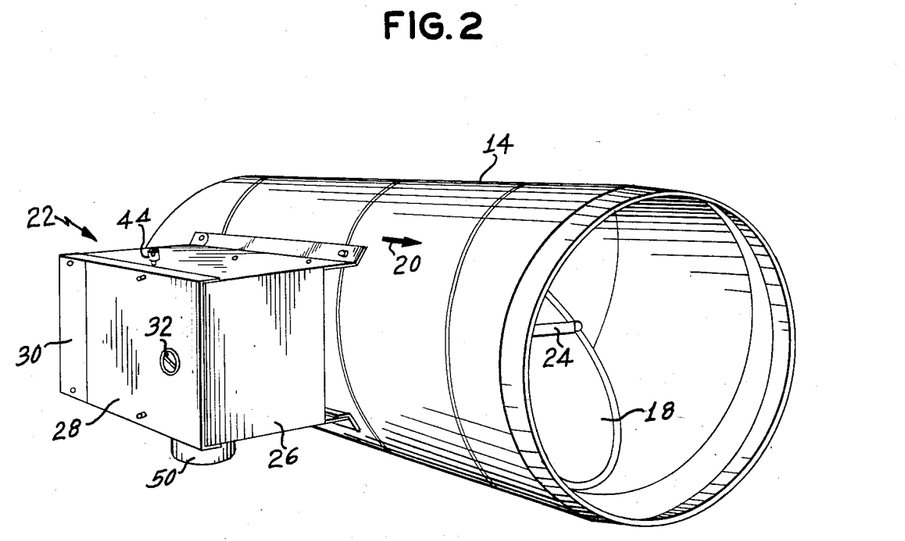
FIG. 2 is a perspective view of a duct and damper assembly incorporated therein.
Figure 3:
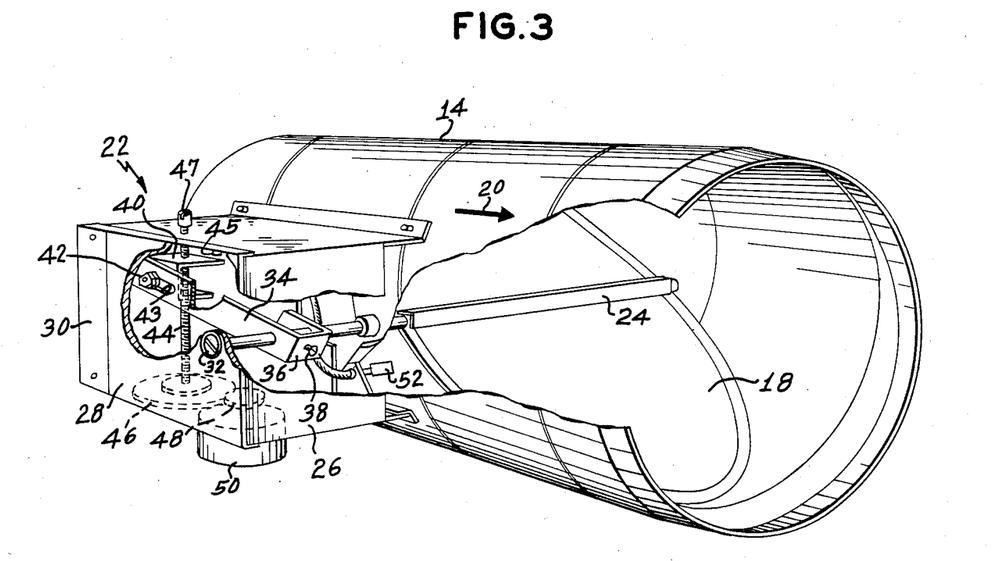
FIG. 3 is a perspective view, similar to FIG. 2, but with components broken away illustrating the structural details of the damper and its operating mechanism.

The elongated duct 14 is of tubular construction and, as illustrated, is of cylindrical configuration which may be constructed of a spiral member. However, the shape and configuration and the size of the duct may vary depending upon the installation requirements. The duct 14 is provided with a directional arrow 20 indicating the direction of air flow longitudinally through the duct 14 and a control box 22 is mounted externally of the duct 14 in order to pivot the damper blade 18 about a central lateral or transverse shaft 24 which extends diametrically of the longitudinal axis of duct 14. It is preferred that the damper blade 18 be eliptical, which per se is known in the art, so that there is a 45° pivoting of the blade between fully open and fully closed positions to, among other advantages, minimize travel of the actuating arm, as hereinafter described. Thus, the duct may be installed in any position in the duct system 11 with the air flow arrow 20 oriented in the direction of air flow of duct system 11 toward the discharge register 12 into the zone 10 being controlled and with the control box 22 easily accessible for service and wiring during installation. Any hardware used in mounting the duct should be oriented adjacent the end portions thereof remote from the travel of the damper blade 18 on that such hardware will not interfere with the operation of the damper blade 18 and/or entry into the control box 22, and if the duct is insulated or provided with insulation, it should not cover the control box 22, but could be located between the control box and duct, if desired, the only requirement being that shaft 24 be fully rotatable.

The control box 22 is attached to the duct 14 in any suitable manner and is provided with a peripheral enclosing wall 26 which has a large removable wall 28 and a smaller removable wall or cover 30 in the area thereof remote from the duct 14 with the damper blade shaft 24 being journaled in relation to the duct 14 and the control box 22 with the free end of the shaft which extends through an opening in the control box 22 terminating just inside the cover 28 with an indicating marking in the form of a slot 32 which is preselected or adjusted to be parallel to damper 18 to provide an indication of the position of the damper 18 within the duct 14. Arm 24 includes a U-shaped end portion 26 through which the shaft 24 extends and which is secured adjustably to the shaft 24 by a set screw 38 whereby movement of the arm 34 causes pivoting of shaft 24. Thus, by loosening and tightening the set screw 38 and turning the shaft 24 with a screw driver engaged in slot 32, the orientation of the shaft 24 and actuating arm 34 may be adjusted with the set screw 38 being tightened to retain a preselected adjusted position as hereinabove set forth.

The other end of the actuating arm 34 is provided with a channel-shaped bracket 40 in which the legs thereof are disposed generally parallel and the bight portion thereof is secured to the arm 34 by a pivot pin or bolt structure 42 with a slot 43 located in arm 34 so that as the arm 34 pivots about the shaft 24, the bracket 40 can move vertically with the bolt structure 42 moving in the slot 43 during such vertical movement by bracket 40. It is to be noted that a slot corresponding to slot 43 may be provided in the bottom of the channel shaped bracket 40 in lieu of being located in arm 34, if desired, or any suitable sliding or the like connection can be made to accommodate the travel of bracket 40 up and down the worm gear 44. The bracket 40 is moved vertically by a vertically disposed worm gear or threaded shaft 44 which is journaled in the top and bottom walls of the control box 26 and is in screw threaded engagement with the bracket 40, so that when the threaded shaft 44 is rotated, the arm 34 will be oscillated depending upon the rotational direction of the shaft 44, thus pivoting the damper shaft 24 and damper blade 18 between open and closed positions. The lower end of the threaded shaft 44 is provided with a gear 46 which is in meshing engagement with a smaller gear 48 driven by a stepper motor 50. Preferably, the stepper motor 50 is located externally of the control box 26 while the gears 48 and 46 may be oriented internally thereof and the threaded shaft 44 may be provided with a screw driver slot 47 in the end thereof oriented externally of the control box 26 to enable the shaft 44 to be rotated manually when desired. Internally of the duct 14 and generally in alignment with a portion of the control box 22, there is a duct sensor 52 which senses the temperature of the air in the entrance end of duct 14 to sense the temperature of the duct air even when damper 18 is fully closed and provides this information to the thermostat 16 by use of integrated circuitry and the like. Also, microswitch structure 45 is included in the control box 26, which may be operated by engagement with the upper side wall of channel shaped bracket 40 to limit vertical movement of the drive bracket 40. Thus, in effect, pivotal movement of the damper blade 18 is limited so that the damper blade 18 can be automatically stopped in full closed position by operation of the microswitch structure 45.

Figures 1, 4:
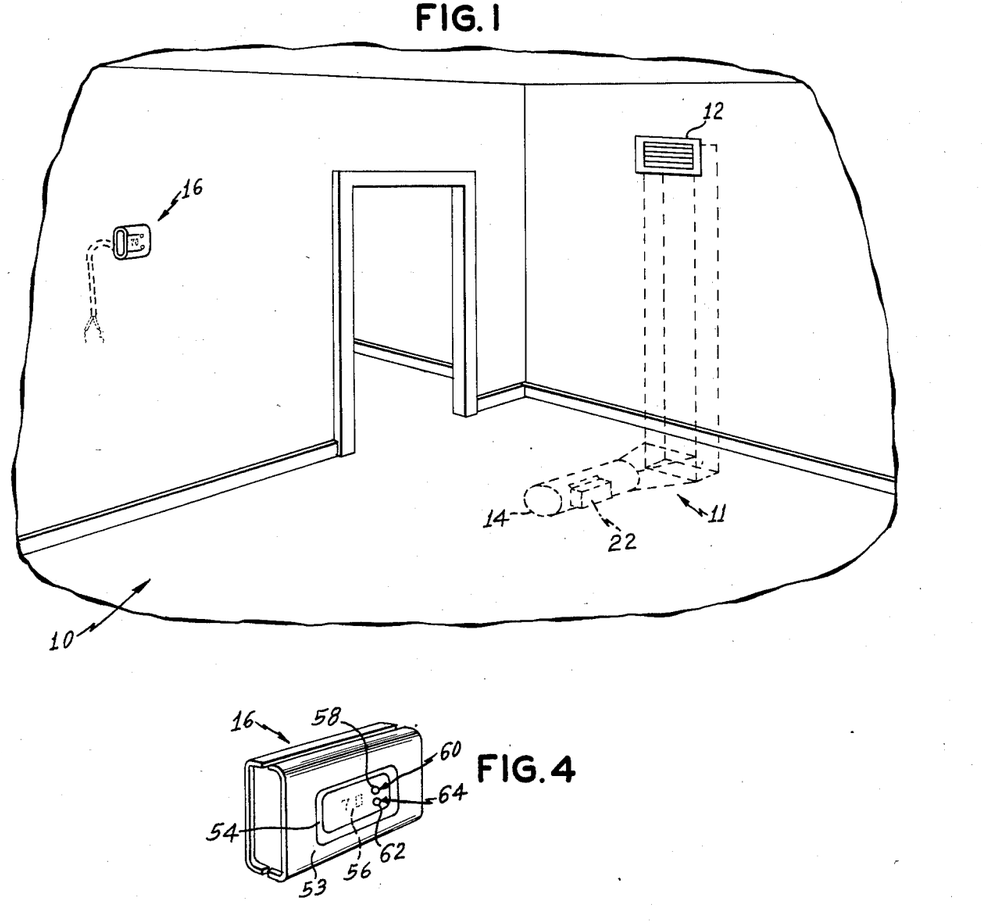
FIG. 1 is a schematic illustration of a controlled zone, thermostat and duct system incorporating the features of the present invention.
FIG. 4 is a perspective view of the thermostat illustrating the digital readout.

The thermostat 16 includes a generally rectangular structure having removable cover components or casing 53 with the front of the cover 53 including a window 54 therein exposing a digital readout 56 to display the set temperature for the zone 10 in °F. Also oriented in the window 54 and adjacent the digital readout 56 is an actuating button 58 adjacent the upper edge of the window 54 alongside of an upwardly directed arrow 60 so that each time the button 58 is actuated, it will increase by one the digit indicated on the readout 56. Likewise, below the button 58 and adjacent the lower edge of the window, a button 62 is provided along with an indicating arrow 64 so that each depression of the button 62 will lower the digit on the readout by one. Thus, by actuating the buttons 58 and 62, the numeral displayed on the digital readout 56 may be adjusted in increments of one between the temperature range of the thermostat which in one typical installation is between 68° F. to 81° F. To raise the set temperature, depress the top button 58 once for each additional degree desired and to lower the temperature, depress the bottom button 62 for each degree the temperature is to be lowered. In order to move the damper blade 18 to fully open position, the thermostat button 58 is actuated to set the thermostat to one degree about its maximum of 81° F. so that the letters "OP" will be displayed in the digital readout 56 and damper will remain in the maximum (open) position, as determined by the maximum (open) stop. In order to place the damper in minimum (closed) position, as determined by the minimum (closed) stop, and retain it there, the thermostat may be set at a temperature one degree below 68° F. by actuating the lower button 62 at which time the digital readout will display "CL" and the damper will remain in the minimum position.

Figure 5:
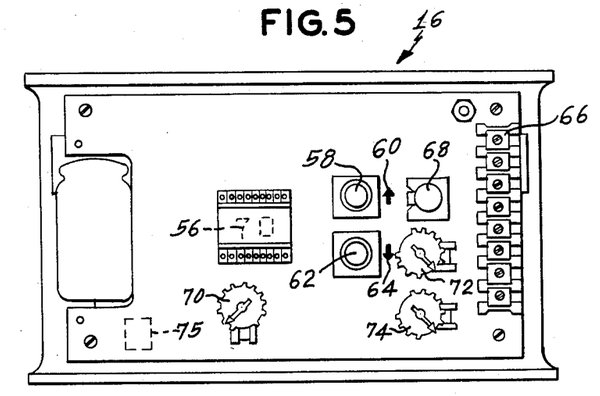
FIG. 5 is an enlarged elevational view of the thermostat illustrating certain of the structural details thereof.

The thermostat 16 should be located on a solid interior wall approximately five feet from the floor where the air from the register 12 will not blow directly on it and, of course, should not be installed near any device that may generate heat or cold. The thermostat 16 may be mounted in any suitable manner and the cover may be provided in two components so that the front thereof may be easily removed, with FIG. 5 illustrating the thermostat with the cover removed and illustrating the orientation of the digital readout 56 and other components including a terminal strip 56 along one end thereof to which color coded wires are connected in a conventional manner. Such color coded wires also are connected to the stepper motor 50 and other circuit components, including duct sensor 52 and microswitch structure 45, in the control box 22 in a conventional manner, with the control box 22 being supplied electrical energy from a 24 volt AC transformer or similar source. Standard procedures and care should be used in connecting the electrical components to assure proper operation after installation.

Referring further to FIG. 5, the thermostat 16 has a calibration capability which includes a calibration push button 68 which, when depressed, the digital display readout will change from the set point temperature to show the room temperature from another sensor 75 which should be compared with the reading on an accurate thermometer. If the room temperature of the space as registered on the accurate thermometer and the room temperature displayed on the digital display do not match, calibration should be made. In order to calibrate the thermostat to accurately reflect the actual room temperature, the button 68 is depressed and while it is retained in the depressed condition, the calibration dial 70 is turned until the temperature displayed on the digital readout 56 on the thermostat 16 matches the temperature of the room as registered on the accurate thermometer. By turning the calibration dial 70 clockwise, it will raise the temperature setting and turning the calibration dial counterclockwise will lower the temperature setting.

Also, the minimum and maximum damper positions are set electronically at the thermostat 16 rather than by a mechanical stop or the like. The maximum stop of damper position may be adjusted from air flow of 53% to an air flow of 100% which, of course, is full open, whereas the minimum stop of damper position may be adjusted from an air flow of 0%, fully closed, to an air flow of 47%. In order to set the limits of modulation, a maximum stop adjustment dial 72 is provided on the printed circuit board along with a minimum stop adjustment dial 74. In order to set the desired limits, the maximum stop 72 should be turned to the desired maximum air flow requirements and the minimum stop 74 should be turned to the desired minimum air flow requirements. In the illustration of FIG. 5, the maximum stop 72 is set at 53% open by virtue of the indicating dial being set at the lower limit, while the minimum stop is set at 100% closed by virtue of the arrow being disposed at the lower stop. A displayed setting of "CL" or "OP" at the thermostat, as hereinabove set forth, will drive the damper to the minimum-maximum positions.

In order to differentiate between heating and cooling modes, the automatic sensor 52 mounted in the duct 14 will sense the air temperature in the duct so that when it exceeds room temperature, a decimal point will be displayed in the lower right corner of the digital readout 56 of the thermostat, which indicates that the damper 18 is in the heating mode and the damper 18 will remain in the heating mode until the duct temperature drops below room temperature at which point the decimal point disappears and the damper 18 is in the cooling mode. When the damper 18 is in the heating mode, it will modulate open on a call for heating and it will modulate closed on a call for cooling. When the damper 18 is in the cooling mode, it will modulate open on a call for cooling and it will modulate closed on a call for heating and the particular mode in which the damper is in will remain the same until the temperature limits are exceeded. It is to be noted that these limits may vary depending upon the installation and that the thermostat 16 when it calls for heating or cooling does not control the heating or cooling system insofar as the availability of heat or cool air supply from a source is concerned, but only controls the volume of air passing through the duct from such source. The sensor 52 can be used to indicate the duct temperature on the digital readout 56, by first removing the cover 53 of the thermostat, and then the calibration button 68 is pushed inwardly and simultaneously pressing either of the warmer or cooler buttons 58 or 62 and the temperature of the air flowing through the duct 14 will then be displayed on the digital readout 56. If the damper 18 is closed the temperature of the air in the inlet of duct 14 will be displayed on readout 56. In the event the temperature exceeds 100° F., only the last two digits of the temperature will be displayed on the readout 56.

In providing this unit, the motorized damper assembly and the microcomputer based electronic thermostat 16 will be provided for each zone to be controlled and the thermostat 16 will modulate a linear motorized damper 18 to maintain desired zone temperature as selected as the thermostat. The thermostat 16 has a two-digit illuminated display which will display the thermostat set point which may be adjusted at the thermostat within the range of the thermostat. Also, minimum and maximum damper stops should be set at the thermostat 16 and the thermostat has a setting to drive the damper 18 to either the minimum or maximum positions; the thermostat digital display 56 will indicate whether the unit is operating in the heating mode or cooling mode. Further, the thermostat 16 may be utilized to indicate the temperature within the duct 14 with a sensor 52 enabling the system to operate in the heating mode when supply air is above a predetermined temperature and operate in the cooling mode when supply air is below a predetermined temperature with the system automatically changing over in response to the temperature in the duct 14.

Figure 6:
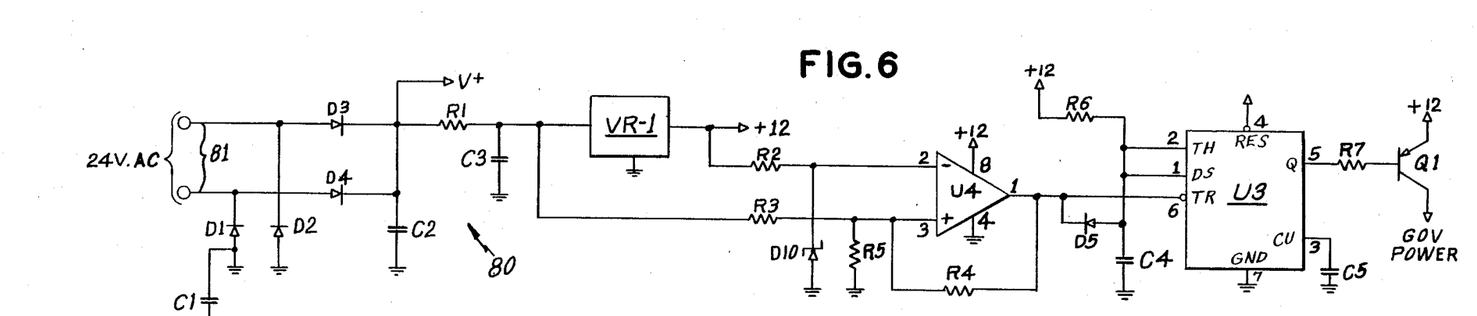
FIG. 6 is a circuit diagram of the power supply for the damper assembly.

Referring now more particularly to the circuit diagram of FIG. 6, the power supply is generally designated by numeral 80 and includes a 24 volt RMS AC source 60 Hz connected to the two conductor power input cable 81 and rectified by full wave diode bridge D1 through D4 with capacitor C1 decoupling the common mode noise to chassis ground and capacitor C2 filters the rectified voltage. This filtered voltage supplies the stepper motor 50 and is reduced through R1 and fed to the input of 12 volt regulator VR1. Capacitor C3 stabilizes the regulator VR1 and the output from VR1 supplies the 12 volt power to all logic elements. Comparator U4 measures the input to VR1 and the output from U4 will switch low if input voltage is not adequate to insure a stable 12 volt output. If the output of U4 goes low, it discharges C4 through D5 and triggers input of timer U3. While timing out, the output of the timer U3 will be high and transistor Q1 will be turned off. Q1 supplies the necessary +12 volt input to the thermostat circuit shown in FIG. 8. Once comparator U4 decides the regulator will provide a clean +12 volt output, it will allow the timer U3 to complete its cycle and turn Q1 on, thus turning on power to the thermostat 16. The time constant of U3 is preset to be a minimum of 50 milliseconds, thus insuring that any type of power failure or power glitch will alway provide the microprocessor of the thermostat 16 with a clean reset.

The stepper motor 50 contains four coils, two in the front and two in the rear of the motor. Alternately energizing the front coils followed by alternately energizing the rear coils will cause the motor 50 to rotate one complete step. The motor driver circuit is generally designated 85 in FIG. 7 and is arranged to energize one front coil and one rear coil in series. Transistors Q2 and Q3 are the drivers for the rear coils of the motor 50 while darlingtons 86 and 87 (U2) are the drivers for the front coils of motor 50. Diodes D6 and D9 suppress inductive kick-back from the motor 50.

Figure 7:
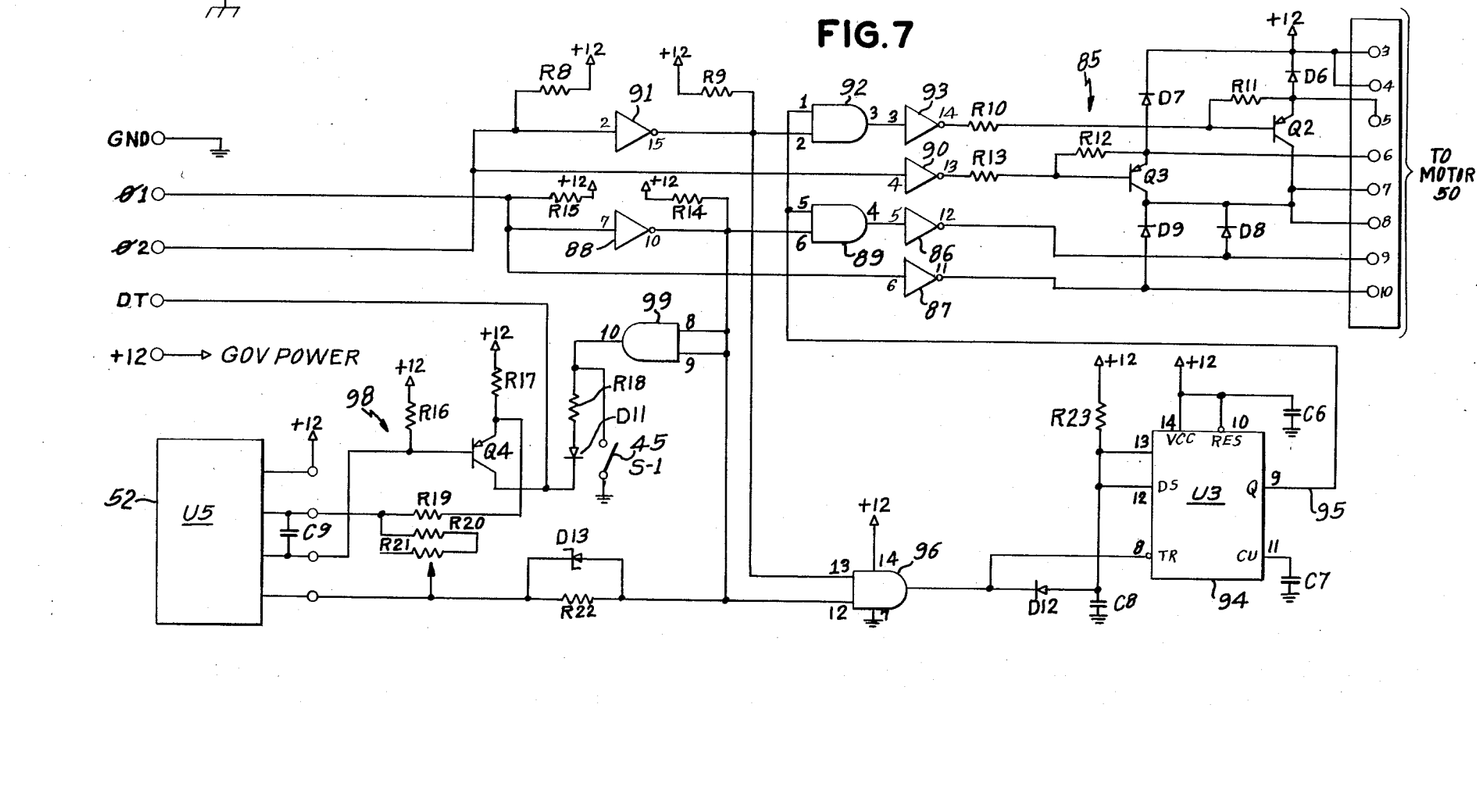
FIG. 7 is a circuit diagram of the motor drive of the damper assembly.

Motor drive input $\emptyset$1 ties directly to the front driver 87 and is also inverted by darlington 88 (U2) and the inverted input is enabled by AND gate 89 (U1) before being presented to the front driver 86. Toggling $\emptyset$1 will alternately power the two front coils of the motor 50. Similarly $\emptyset$2 has a direct path to a rear coil driver 90 and an inverted path via darlington 91 and AND gate 92 (U1) to the other rear coil driver 93.

When at rest, $\emptyset$1 and $\emptyset$2 will both be low. Timer 94 (U3) at 95, will eventually time out and go low thus causing the selected path to the drivers 86 and 93 to be disabled respectively through AND gates 89 and 92, de-energizing the motor 50.

To drive the motor 50 forward, $\emptyset$1 is brought high causing the output of darlington 88 to go low; the output of AND gate 96 will also go low triggering timer 94 at output 95 high enabling AND gates 89 and 92. With $\emptyset$1 high, front driver 87 is on and $\emptyset$2 is low at this point, but is inverted and enabled at the output of AND gate 92 turning on driver Q2. When $\emptyset$2 which alternates the back coils, is brought high $\emptyset$1 is brought low and making $\emptyset$2 low completes one forward direction cycle of the motor. In order that the motor is reversed, one merely substitutes $\emptyset$2 for $\emptyset$1 in the above description.

The solid state temperature sensor 52 mounted in the air duct 14 is connected to the motor driver circuit 85 by appropriate wiring. The output from sensor 52 is connected to a voltage controlled current source (V.C.C.S.) generally indicated by numeral 98, and includes Q4, R16, R17, and R19. The output of the V.C.C.S. 98 is routed to the thermostat 16 via the D.T. (Duct Temperature) line. Power of the temperature sensor 52 is supplied through R22 only when $\emptyset$9 is brought high. Zener diode D13 prevents latch-up. R20 and variable resistor R21 permits the sensor 52 to be calibrated in accord with the description hereabove set forth.

When $\emptyset$1 is low, no current flows from Q4, but AND gate 99 supplies current to the D.T. line through R18 and D11, such current being interrupted if the switch 45 is closed. The switch 45 when closed causes the motor 50 to close the damper 18 and indicates to the thermostat 16 that the damper 18 is so closed.

Figure 8:
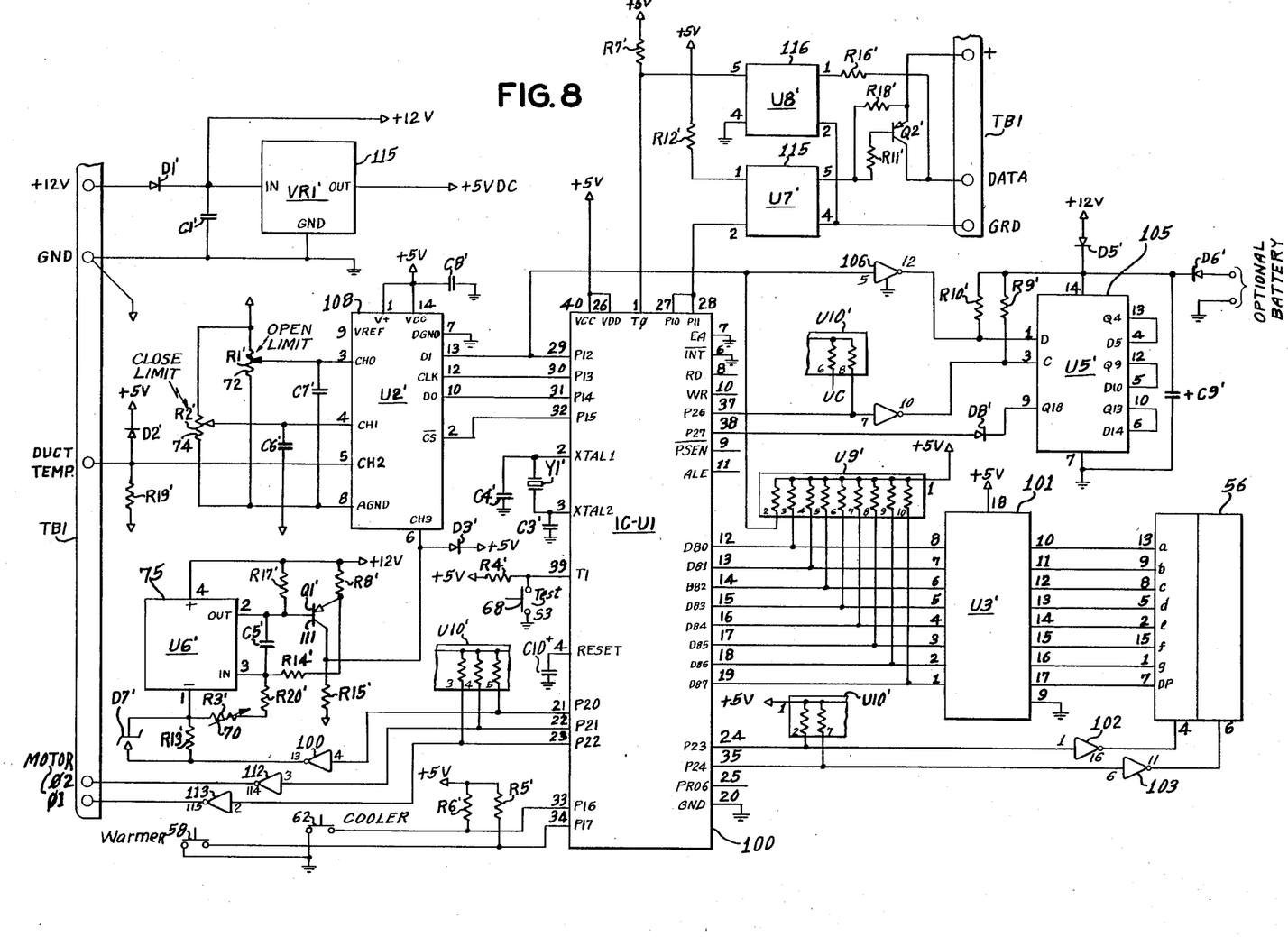
FIG. 8 is a circuit diagram of the microprocessor based thermostat.

Referring now to FIG. 8, the microprocessor 100 (IC-U1) comprises the primary portion of the thermostat 16 and the circuits of FIGS. 6 and 7, and other circuit elements of FIG. 8 interface either directly or indirectly to the microprocessor 100.

The clock frequency is generated by 3.58 MHz crystal Y1' and capacitors C3' and C4'. Power-on reset is determined by the discharging and charging of C10'.

The display portion includes a 2 digit LED readout 56, display driver 101 (U3) and two darlingtons 102 and 103. The readout 56 has two seven-segment digits and operates in the multiplexed mode. Data to the readout 56 comes from the data bus of the microprocessor 100 (pins 12 through 19), and is buffered by driver 101. The outputs of driver 101 connect to the anodes of the readout 56 and are active high.

Digit selection is performed by placing a logic high on pin 24 or 35 of microprocessor 100 thus causing a collector darlington 102 or 103 to pull the cathode of digit one or digit two low.

A Cmos 18 bit shift register 105 (U5') serves as a temporary storage for the set point of the thermostat 16 during power outage. Capacitor C9' is maintained at 11.5 volts through diode D5' when power is being supplied, and provides the power source to shift register 105 when power is down, D5 preventing the power supply from discharging C9'.

Data to be stored originates at microprocessor 100, pin 29, and is inverted by darlington 106 (U4) before being presented to shift register 105 data input, pin 1. The data to be read from memory is present at shift register 105, pin 9. The data from shift register 105 is fed to the microprocessor 100, pin 38. The data from shift register 105 pin 9 and data originating at microprocessor 100 pin 37 are clocked at shift register 105 pin 3.

A four channel analog to digital converter 108 (U2') serves to interface the analog signals to the microprocessor 100. The analog signals come from two potentiometers 72 (R1') and 74 (R2'), OPEN LIMIT and CLOSE LIMIT, respectively, and two temperature sensing circuits (including room temperature sensor 75 and associated circuit and duct temperature sensor 52 and associated circuit). Data is transmitted to and received from the microprocessor 100 serially over pin 13 and 10 of converter 108, and is clocked at pin 12 of converter 108. A low on pin 2 of converter 108 enables the converter 108 during data transfer to and from the microprocessor 100.

Three lines of the microprocessor 100, pins 39, 33 and 34, are sourced to +5 volts through resistors R4', R6' and R5' respectively, and are in turn connected to grounding pushbutton switches 68, 62 and 58, previously described in connection with FIG. 5. These switches allow an operator to interact with the system depending on the information desired to be displayed on readout 56 or to change the set points, etc. When a button switch is depressed, a logic low is input to the microprocessor 100 on its associated input line, as will be apparent to those skilled in the art.

When the microprocessor 100 is called upon for a temperature reading of the zone or room by depressing button switch 68 a high is placed in PORT 20 of microprocessor 100 at pin 21 and darlington 110 inverts this and allows current to flow into pin 1 of temperature sensor 75 through R13'. Zener diode D7' prevents the circuit from latching-up. Temperature sensor 75 output pin 2 then swings to a voltage that will cause inverting input pin 3 to be equal to Vcc-.01 K., where Vcc=power supply voltage (approx. 11.5 volts) and K=absolute room temperature in degrees Kelvin. Voltage controlled voltage source 111 (Q1'), R20', R8', and R15' re-references the output voltage to ground for compatibility with the converter 108. Diode D3' serves to clamp the voltage at 5.5 volts. After a conversion has been made, the microprocessor 100 returns PORT 20 pin 21 to logic low, thus removing power from sensor 75 and preventing erroneous temperatures therefrom which may be caused by self-heating if power were left on to sensor 75. Feed back resistor R14' was chosen so that an output voltage range of 0 to 5 volts (0 to 255 analog to digital counts) represents a room temperature of 63.25° F. and 88.75° F. (1 analog to digital count per 0.1° F.).

Potentiometer 70 (R3') and resistor R20' allow a calibration range of +10° F. minimum, and capacitor C5' prevents oscillation.

The microprocessor 100 at PORTS P21 and P22 connect to darlingtons 112 and 113 whose outputs go to the motor control terminals ∅2 and ∅1 respectively. A low on ∅1 and ∅2 will cause the motor 50 to be de-energized. 90° out of phase square waves on ∅1 and ∅2 will cause the motor 50 to operate, and the direction of motor rotation is determined by either the leading or lagging phase angles of the square waves.

The channel 2 (pin 5) input of analog to digital converter 108 is connected to the duct temperature terminal connected to the output of Q4 of FIG. 7. When ∅1 is high, the output of Q4 will be a current proportional to the temperature of the air passing through the duct 14. Load resistor R19' converts this current to voltage for the converter 108 and D2' clamps the voltage at 5.5 volts. When ∅1 is brought low, the damper sources the duct temperature line to ground, if switch 45 is closed, or logic high, if switch 45 is open.

Communication channels are provided to the thermostat 16, particularly to interface remote controls with microprocessor 100. Opto-isolators 115 and 116 (U7', and U8') and transistor Q2' comprise an electrically isolated remote communications link. When the microprocessor 100 places a low on pin 27 and 28, opto-isolator 115 is turned on pulling pin 5 thereof low. This turns on Q2 which puts a high on the DATA line. When the microprocessor 100 returns pin 27 and 28 high, opto-isolator 115 turns off, Q2' turns off, and the DATA line returns low. A high on the DATA line turns opto-isolator 116 on and pin 5 therefrom goes low which the microprocessor 100 can input at pin 1. When the DATA line is returned low, opto-isolator 116 switches off inputting a high to pin 1 of the microprocessor 100.

Regulated 12 volts is provided to the governor thermostat 16 (the circuit of FIG. 8) from the power supply 80 of FIG. 6. Blocking diode D1' protects against accidental polarity reversal and enhances noise rejection. Voltage regulator 115 (VR1') provides 5 volts for the microprocessor and associated logic. Capacitor C1' stablizes the regulator 115.

The system of the present invention is operated from a program stored in the program memory of the microprocessor 100. The program is in machine code and comprises the instruction addresses and the instructions.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit of the invention.

What is claimed as new and what it is desired to secure by Letters Patent of the United States is:

1. In a temperature control system for maintaining the temperature of a zone at a predetermined set point by controlling air flow into the zone comprising a damper assembly remote from the zone and oriented partially in a duct supplying conditioned air to the zone for controlling the air flow into the zone, and a thermostat located in the zone to be controlled, said thermostat including movable means adjusted to said predetermined set point to be maintained in the zone and operatively connected to said remote damper assembly, said damper assembly including a damper blade means movable between open and closed positions in the duct and further including a motor assembly remote from the zone and the duct for driving said damper blade means selectively in either direction between open and closed positions, said motor assembly including an electrical stepper motor, said damper assembly including an actuating arm connected to said damper blade means, and means drivingly connecting said motor to said actuating arm to move said damper blade means in response to actuation of said motor in either direction between open and closed positions, said thermostat including logic means for providing a series of logic pulses to said stepper motor for controlling the operation of said stepper motor and varying the position of said damper blade means to reduce or increase the volume of air flowing through the duct into the zone to be controlled.

2. In the system as defined in claim 1 wherein said thermostat includes a digital readout displaying the selected predetermined set point of the desired temperature in the zone, said thermostat further including movable means being selectively adjustable for raising and lowering the set point and having a first switch connected to said logic means for raising the displayed temperature on said digital readout one degree for each actuation of said first switch and a second switch connected to said logic means for lowering the displayed temperature on said digital display by one degree for each actuation of said second switch.

3. In the system as defined in claim 2 in which said thermostat includes a temperature range of set points and wherein continued operation of either of said first and second switches respectively to a temperature above or below said temperature range of said thermostat will cause a displayed indication on said digital display of a fully open or fully closed set points by said logic means and movement of said damper blade means to its corresponding fully open or fully closed positions.

4. In a temperature control system for maintaining the temperature of a zone at a predetermined set point by controlling air flow into the zone comprising a damper assembly remote from the zone and oriented partially in a duct supplying conditioned air to the zone for controlling the air flow into the zone, and a thermostat located in the zone to be controlled and adjusted to said predetermined set point to be maintained in the zone and operatively connected to said remote damper assembly, said damper assembly including a damper blade means movable between open and closed positions in the duct and further including a stepper motor assembly remote from the zone and the duct for driving said damper blade means selectively in either direction between open and closed positions, said thermostat including logic means for providing a series of logic pulses to said stepper motor for controlling the operation of said stepper motor for varying the position of said damper blade means and reducing or increasing the volume of air flowing through the duct into the zone to be controlled, said thermostat further including a digital readout displaying the selected predetermined set point of the desired temperature in the zone, said damper assembly having a first temperature sensor located in the ingress side of the duct for determining the temperature of the air therein and located on the ingress side of said damper blade means, said first sensor being electrically coupled to said logic means of said thermostat to selectively display the actual duct air temperature on said digital readout.

5. In the system as defined in claim 4 wherein said thermostat includes a second temperature sensor coupled to said logic means of said thermostat for sensing the zone temperature, and selectively actuable switch means coupled between said second sensor and said logic means to indicate the zone temperature on said digital readout.

6. In the system as defined in claim 5 wherein said thermostat includes adjustable calibration means coupled to said logic means to vary the readout on said digital readout from said second sensor to indicate the zone temperature actually registered on an accurate thermometer employed by an installer of said thermostat.

7. In the system as defined in claim 5 wherein said thermostat further comprises means for comparing said duct and zone temperature respectively from said first and second sensors and, when said duct temperature is higher than said zone temperature, said logic means of said thermostat operates said damper assembly in the heating mode with said damper assembly continuing to operate in the automatically selected heating mode in response to the comparison of said duct and zone temperatures, and, when said duct temperature is lower than said zone temperature, said logic means of said thermostat operates said damper assembly in the cooling mode with said damper assembly continuing to operate in the automatically selected cooling mode in response to the comparison of said duct and zone temperatures.

8. In the system as defined in claim 7, further comprising means coupled to said digital readout to indicate the heating mode or cooling mode thereon while simultaneously displaying said zone temperature or set point temperature or duct temperature.

9. In a temperature control system for maintaining the temperature of a zone at a predetermined set point by controlling air flow into the zone comprising a damper assembly remote from the zone and oriented partially in a duct supplying conditioned air to the zone for controlling the air flow into the zone, and a thermostat located in the zone to be controlled, said thermostat including movable means adjusted to said predetermined set point to be maintained in the zone and operatively connected to said damper assembly, said damper assembly including a damper blade means movable between open and closed positions in the duct and further including a motor assembly remote from the zone and duct having a stepper motor for driving said damper blade means selectively in either direction between open and closed positions, said thermostat including logic means for providing a series of logic pulses to said stepper motor for controlling the operation of said motor assembly for varying the position of said damper blade means and reducing or increasing the volume of air flowing through the duct into the zone to be controlled, said thermostat having adjustment means within the zone for setting the operation limits of said motor assembly from said logic means of said thermostat to provide minimum and maximum damper means opening and closing positions of said damper assembly, said thermostat includes digital readout displaying the selected predetermined set point of the zone temperature, said damper assembly including a first temperature, said damper assembly including a first temperature sensor located in the ingress side of the duct for determining the temperature of the air therein and located on the ingress side of damper blade means, said first sensor being electrically coupled to said thermostat to selectively display the actual air temperature in the duct on said digital readout.

10. In the system as defined in claim 9 wherein said thermostat includes a second temperature sensor for sensing the zone temperature, and selectively actuable switch means coupled between said second sensor and said digital readout to indicate the zone temperature on said digital readout.

11. In the system as defined in claim 10 wherein said thermostat includes adjustable calibration means to vary the readout on said digital readout from said second sensor to indicate the zone temperature actually registered on an accurate thermometer employed by an installer of said thermostat.

12. In the system as defined in claim 10 further comprising means for comparing said duct and zone temperatures respectively from said first and second sensors and, when said duct temperature is higher than said zone temperature, said thermostat operates said damper assembly in the heating mode with said damper assembly continuing to operate in the automatically selected heating mode in response to the comparison of said duct and zone temperatures, and, when said duct temperature is lower than said zone temperature, said thermostat operates said damper assembly in the cooling mode with said damper assembly continuing to operate in the automatically selected coding mode in response to the comparison of said duct and zone temperatures.

13. In the system as defined in claim 12, further comprising means coupled to said digital readout to indicate the heating mode and cooling mode thereon while simultaneously displaying said zone temperature.

14. In the system as defined in claim 9 wherein said thermostat includes means for raising and lowering the set point and having a first switch for raising the displayed temperature on said digital readout one degree for each actuation of said first switch and a second switch for lowering the displayed temperature on said digital display by one degree for each actuation of said second switch.

15. In the system as defined in claim 14 in which said thermostat includes a temperature range of set points and wherein continued operation of either of said first and second switches respectively to a temperature above or below said temperature range of said thermostat will cause a displayed indication on said digital display of a fully open or fully closed set points and move said damper blade means to its corresponding fully open or fully closed position.

16. In the system for accurately maintaining a set temperature in a controlled zone supplied conditioned air from a source through a duct provided with a damper remote from the zone for controlling air flow therethrough comprising a selectively settable thermostat disposable in the controlled zone by which a set temperature controls said damper to control the volume of conditioned air flowing into the zone and matching the zone load, said damper including a blade in the duct and a first temperature sensor located on the air ingress side of said blade in the duct for sensing the air temperature thereof, said thermostat including a second temperature sensor for sensing the air temperature of the controlled zone, said thermostat including means for receiving information from said first and second sensors and varying said damper blade depending on said set temperature on said thermostat and said information received from said first and second sensors, said damper including a motor assembly for driving said damper blade selectively in either direction between its open and closed positions, said thermostat having adjustment means within the controlled zone for setting the operational limits of said motor assembly from said thermostat to provide minimum and maximum damper blade opening and closing positions of said damper.

17. In the system as defined in claim 16 wherein said means for receiving information includes means for comparing said duct and zone temperatures respectively from said first and second sensors and, when said duct temperature is higher than said zone temperature, said thermostat operates said damper in the heating mode with said damper continuing to operate in the automatically selected heating mode in response to the comparison of said duct and zone temperatures, and when said duct temperature is lower than said zone temperature, said thermostat operates said damper in the cooling mode with said damper continuing to operate in the automatically selected cooling mode in response to the comparison of said duct and zone temperatures.

18. In the system as defined in claim 17, wherein said thermostat further comprises a digital readout displaying the selected set temperature of the zone and means coupled to said digital readout to indicate the heating mode and cooling mode of said damper thereon while simultaneously displaying said zone or duct temperature.

19. In the system as defined in claim 16 wherein said motor assembly includes an electrical stepper motor, said means for receiving information including logic means for providing a series of logic pulses to said stepper motor for controlling the operation of said stepper motor, said damper including an actuating arm connected to said damper blade means and means drivingly connecting said motor to said actuating arm to move said damper blade means in response to actuation of said motor in either direction between open and closed positions.

20. In a microprocessor based damper system including a thermostat having a selectable set temperature set point and disposable in a controlled zone to be supplied with conditioned air from a source through a duct comprising damper means for varying the volume of air passing through the duct into the zone, and a microprocessor means for receiving input data from a duct temperature sensor located in the duct and a zone temperature sensor located in the zone for controlling said damper means to vary the volume of air passing through said damper means to maintain the temperature in the zone at the selected set temperature set point on said thermostat, said microprocessor means including means for comparing said duct and zone temperature data respectively from said duct and zone sensors and, when said duct temperature data is higher than said zone temperature data, said microprocessor means operates said damper means in the heating mode with said damper means continuing to operate in the automatically selected heating mode in response to the comparison of said duct and zone temperature data, and when said duct temperature data is lower than said zone temperature data, said microprocessor means operates said damper means in the cooling mode with said damper means continuing to operate in the automatically selected cooling mode in response to the comparison of said duct and zone temperature data.

21. In the system as defined in claim 20 wherein said zone temperature sensor is located in said thermostat for determining the temperature of the air in the zone.

22. In the system as defined in claim 21 further including a digital readout displaying the selected set temperature set point, and selectable means for displaying on said digital readout the actual temperature of the zone.

23. In the system as defined in claim 22 wherein said selectable means includes means for displaying the temperature of the air in the duct on said digital readout.

24. In the system as defined in claim 23 wherein said microprocessor means includes switching means for raising and lowering the set point temperature displayed on said digital readout.

25. In the system as defined in claim 24 wherein said thermostat includes adjustment means for setting the minimum and maximum air flow through said damper means.

26. In the system as defined in claim 25 wherein said damper means includes a damper blade and an electrical stepper motor, said microprocessor means including logic means for providing a series of logic pulses to said stepper motor to control the operation thereof, an actuating arm connected to said damper blade, and means drivingly, connecting said motor to said actuating arm to move said damper blade in response to actuation of said motor in either direction between open and closed positions.

27. In the system as defined in claim 26 wherein said damper blade is disposed in the duct and a shaft is pivotally oriented across the duct and carrying said blade, means for connecting said actuating arm to said shaft whereby movement of said actuating arm will pivot said shaft and move said damper blade between open and closed positions.

28. In the thermostat as defined in claim 24 further including adjustable calibration means to vary the readout of the zone temperature on said digital readout from said zone sensor to conform with the actual zone temperature on an accurate thermometer employed by an installer of said thermostat.

29. In a temperature control system for maintaining the temperature of a zone at a predetermined set point by controlling air flow into the zone comprising a damper assembly oriented in a duct supplying conditioned air to the zone for controlling the air flow into the zone, and a thermostat located in the zone to be controlled and adjusted to said predetermined set point to be maintained in the zone and operatively connected to said damper assembly, said damper assembly including a damper blade means movable between open and closed positions and further including a motor assembly for driving said damper blade means selectively in either direction between open and closed positions, said thermostat including means controlling the operation of said motor assembly for varying the position of said damper blade means and reducing or increasing the volume of air flowing through the duct into the zone to be controlled, said damper assembly having a first temperature sensor located in the duct for determining the temperature of the air therein, said first sensor being electrically coupled to said thermostat, a second temperature sensor for sensing the zone temperature and electrically coupled to said thermostat, means for comparing said duct and zone temperatures respectively from said first and second sensors and, when said duct temperature is higher than said zone temperature, said thermostat operates said damper assembly in the heating mode with said damper assembly continuing to operate in the automatically selected heating mode in response to the comparison of said duct and zone temperatures, and when said duct temperature is lower than said zone temperature, said thermostat operates said damper assembly in the cooling mode with said damper assembly continuing to operate in the automatically selected cooling mode in response to the comparison of said duct and zone temperatures.

30. A method of automatically determining the heating or cooling mode of a zone thermostat which controls a zone duct damper being fed by a single air supply duct providing heated or cooled conditioned air comprising the steps of:
   A. determining the zone temperature,
   B. determining the duct temperature of the air in the supply duct, and
   C. comparing the zone temperature to the duct temperature and
      (a) when the duct temperature is warmer than the zone temperature, the thermostat operates the zone duct damper in the heating mode and substantially opens the zone duct damper upon the thermostat sending a zone demand for heat when the zone temperature is a predetermined amount below set point and substantially closes the zone duct damper upon the thermostat sensing no zone demand or a zone demand for cooling, and
      (b) when the duct temperature is cooler than the zone temperature, the thermostat operates the zone duct damper in the cooling mode and substantially opens the zone duct damper upon the thermostat sensing a zone demand for cooling when the zone temperature is a predetermined amount above set point and substantially closes the zone duct damper upon the thermostat sensing no zone demand or zone demand for heat.

31. The method of claim 30 wherein said step B is performed on the air prior to the ingress of the air through the damping means of the duct damper.

32. The method of claim 30 wherein
   said step C(a) further includes the step of modulating the zone duct damper between open and closed positions when the zone temperature is between set point and the predetermined amount below set point, and
   said step C(b) further includes the step of modulating the zone duct damper between open and closed positions when the zone temperature is between set point and the predetermined amount above set point.

33. The method of claim 32 wherein said step B is performed on the air prior to the ingress of the air through the damping means of the duct damper.

* * * * *